(12) United States Patent
Yabuki (10) Patent No.: US 6,990,473 B1
(45) Date of Patent: Jan. 24, 2006

(54) INFORMATION MANAGEMENT SYSTEM

(75) Inventor: Tsutomu Yabuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 09/696,201

(22) Filed: Oct. 26, 2000

Related U.S. Application Data (63) Continuation of application No. PCT/JP99/00679, filed on Feb. 17, 1999.

(30) Foreign Application Priority Data

Jun. 17, 1998 (JP) .......................... 10-170340

(51) Int. Cl.
*G06F 17/60* (2006.01)

(52) U.S. Cl. ............... 705/400; 705/1; 705/23; 705/28; 705/14; 705/16

(58) Field of Classification Search ............... 235/383, 235/375, 385; 705/37, 14, 20, 21, 26, 28, 705/400, 415, 416; 707/3, 1; 177/5; 379/114.02; 725/134
See application file for complete search history.

(56) References Cited

U.S. PATENT DOCUMENTS

| | | | | |
|---|---|---|---|---|
| 4,776,045 A | * | 10/1988 | Mysliwiec et al. | .............. 2/426 |
| 4,879,650 A | * | 11/1989 | Kurimoto et al. | ............ 364/405 |
| 5,452,269 A | * | 9/1995 | Cherdak | ....................... 368/10 |
| 5,481,094 A | * | 1/1996 | Suda | ........................... 235/383 |
| 5,537,312 A | * | 7/1996 | Sekiguchi et al. | ....... 364/401 R |
| 5,539,393 A | * | 7/1996 | Barfod | .................... 340/825.52 |
| 5,604,923 A | * | 2/1997 | Wilkus | ........................ 455/67.7 |
| 5,704,049 A | * | 12/1997 | Briechle | ...................... 395/326 |
| 5,791,080 A | * | 8/1998 | Hamano | ................... 40/642.02 |
| 5,802,015 A | * | 9/1998 | Rothschild et al. | ............ 368/10 |
| 5,838,286 A | * | 11/1998 | Pfeiffer et al. | ................. 345/30 |
| 6,246,677 B1 | * | 6/2001 | Nap et al. | .................... 370/346 |

FOREIGN PATENT DOCUMENTS

| | | |
|---|---|---|
| EP | 000765054 A2 * | 9/1996 |
| JP | 63-113755 A | 5/1988 |
| JP | SHO 63-188298 A | 8/1988 |
| JP | 02-171891 A | 7/1990 |
| JP | 04-024791 A | 1/1992 |
| JP | HEI 5-054211 A | 3/1993 |
| JP | 05-324894 A | 12/1993 |
| JP | 07-249178 A | 9/1995 |
| JP | HEI 8-329350 A | 12/1996 |
| JP | 10-49756 A | 2/1998 |
| JP | 10-111656 A | 4/1998 |

OTHER PUBLICATIONS

Penelope Ody, "In–Store Innovations: From electronic shelf–edge labels to gizmos for personal shoppers New electronic wizardry in the marketplace", Financial Times, London(UK), Jun. 3, 1998, p. 06.*

* cited by examiner

*Primary Examiner*—Frantzy Poinvil
*Assistant Examiner*—Debra F Charles
(74) *Attorney, Agent, or Firm*—Staas & Halsey LLP (57) ABSTRACT

One or a plurality of commodities are placed in a commodity exhibition shelf (8). Information peculiar to any commodity is read using an input device (2) under the control of a control device (1). It is checked from the information whether any condition, for example, a discount should be given or the like, is stored with respect to the commodity in an information storage device (4). If a condition is stored, then the condition is displayed on a display device (3).

9 Claims, 11 Drawing Sheets

| COMMODITY MANAGEMENT INFORMATION ||
|---|---|
| COMMODITY CODE | D1 |
| DATE | D2 |
| PRICE | D3 |
| DISCOUNT CONDITION | D4 |
| SUPPLEMENTARY INFORMATION | D5 |

INFORMATION MANAGEMENT SYSTEM

This is a continuation of application No. PCT/JP99/00679, filed Feb. 17, 1999.

TECHNICAL FIELD

The present invention relates to an information management system. More particularly, this invention relates to an information management system for producing and managing data of commodities arranged on commodity display shelves.

BACKGROUND ART

In the conventional information management system, management of time, management of the number of items sold and work of sticking the labels to the commodities in order to manage the freshness of commodities and reflect it to sales conditions were conducted manually. In general, in stores and supermarkets, commodities are typically provided with supplementary information such as the amount of discount according to the freshness of commodities. For example, the price of the commodities are reduced based on the time elapsed since the manufacture of an eatable commodity. In such a case, it is necessary to manually stick labels having information such as discounts written thereon to commodities.

When sticking the labels, a clerk visually discriminates the commodities, and judges information such as manufacturing date. If there are faults such as mistakes in information reading, forgetting sticking, or mistakes in sticking, therefore, then commodities which are old and degraded in commodity value are in some cases exhibited in the shop as they are without a new label.

In order to eliminate such mistakes, therefore, there is a technique of managing time zones of discount as described in Japanese Patent Application Laid-Open No. 63-188298, Japanese Patent Application Laid-Open No. 5-54211, and Japanese Patent Application Laid-Open No. 8-329350.

As a matter of course, the work of manually sticking labels needs quickness, accuracy, and experience. The store is more crowded in some time zones than in other time zones. Therefore, even if the clerk is well experienced, the work itself is interfered with. Thus, the work of label sticking is complicated.

Furthermore, in conventional information management systems, information is managed by a POS (Point of Sales) system, as described in the aforementioned Japanese Patent Application Laid-Open Publications. Therefore, mistakes in data processing arising due to human error are reduced. If there are discounts or the like on commodities in a salesroom having commodity shelves arranged therein, therefore, their guidance must be conducted manually. Eventually, this results in a problem that a great deal of human labor is needed for the commodity management.

An object of the present invention is to provide an information management system capable of implementing all commodity management in a store inclusive of commodity management in its salesroom without requiring human hands, in order to eliminate the above described problems of the conventional technique.

DISCLOSURE OF THE INVENTION

An information management system according to the present invention is an information management system for managing information concerning one or a plurality of commodities, each having information peculiar to the commodity attached thereto and is characterized in that the information management system includes: a storage unit for storing information representing a predetermined condition for displaying information peculiar to a commodity and a guide concerning the commodity, in association with a kind of the commodity; an input unit for inputting information peculiar to a commodity, attached to the commodity, by using a reading scheme; a control unit for collating the information peculiar to a commodity inputted by the input unit with information stored in the storage unit, the control unit being responsive to existence of a matching commodity kind in the collation and satisfaction of the predetermined condition corresponding to the commodity kind, to generate data for displaying a guide concerning the commodity, based on information stored in the storage unit; and a display unit for displaying a guide concerning a commodity, based on data generated by the control unit.

According to the present invention, information peculiar to the commodity is inputted by using a reading scheme, and when a commodity corresponding to that information satisfies, for example, the condition of a discount, a guide concerning the commodity is displayed. Therefore, management suitable for the commodity can be implemented dynamically and automatically. As a result, all commodity management in the store inclusive of the commodity management in the salesroom can be implemented without requiring human hands.

Furthermore, the information management system according to the present invention is characterized in that the information management system includes a processing device connected to the control unit via a line, and the processing device updates information stored in the storage unit via the control device.

According to the present invention, the processing device is connected via the line, and the information peculiar to the commodity and a predetermined condition for displaying a guide concerning the commodity are updated. Therefore, it is possible to provide a required commodity with the newest information in real time.

Furthermore, the information management system according to the present invention is characterized in that the information management system includes a timer for measuring time, and the control unit refers to the time measured by the timer when generating data.

According to the present invention, the measured time measured is referred to, when generating display data. Therefore, the display of the guide concerning the commodity can be controlled according to the time.

Furthermore, the information management system according to the present invention is characterized in that the control unit generates data for displaying a guide concerning a commodity, based on information peculiar to the commodity stored in the storage unit.

According to the present invention, irrespective of the predetermined condition, data for displaying the guide concerning the commodity is generated on the basis of the information peculiar to the commodity. Therefore, it is possible to display information peculiar to the commodity suitably without restriction.

Furthermore, the information management system according to the present invention is characterized in that the storage unit, the input unit, the control unit, and the display unit are disposed on a commodity exhibition shelf for exhibiting commodities.

According to the present invention, information peculiar to the commodity placed on the commodity exhibition shelf for exhibiting the commodity are input using the reading scheme. When the commodity corresponding to the information has satisfied a predetermined condition, the guide concerning the commodity is displayed. Without the intervention of a person in the sales room, therefore, the commodity exhibition shelf itself can provide customers with necessary information.

Furthermore, the information management system according to the present invention is characterized in that the input unit optically reads information peculiar to a commodity, attached to the commodity.

According to the present invention, information peculiar to the commodity attached to the commodity is read optically. Therefore, information peculiar to the commodity can be acquired easily.

Furthermore, the information management system according to the present invention is characterized in that the information management system further includes a package which houses the commodity and which has a radio unit for storing information peculiar to the commodity and conducting radio communication, and the input unit reads information peculiar to the commodity stored in the radio unit.

According to the present invention, the radio unit storing information peculiar to the commodity and conducting radio communication is provided in a package for housing the commodity. Information peculiar to the commodity stored in the radio unit can be read in a radio form. As a result, information peculiar to the commodity can be acquired easily.

Furthermore, the information management system according to the present invention is characterized in that the package further includes a display unit for displaying information received by the radio unit in communication with the input unit.

According to the present invention, a display unit is provided in the package, and information received by the radio unit is displayed. Therefore, it is possible to ascertain, directly from an individual commodity, the information concerning the commodity.

Furthermore, the information management system according to the present invention is characterized in that the information management system further includes measurement unit for measuring the weight of a commodity, the information peculiar to a commodity includes information for associating its weight with its price, and the control unit determines the price of a commodity based on the weight measured by the measurement unit and information peculiar to the commodity stored in the storage unit and transmits the determined price by using the input unit in a radio form.

According to the present invention, weight of the commodity is measured. Then, on the basis of the measured weight and information peculiar to the commodity for associating the weight with the price, the price of the commodity is determined. The determined price is transmitted to the commodity by radio means. As for the price of a commodity which varies according to the weight, therefore, the newest price can be displayed on the commodity side.

Furthermore, the information management system according to the present invention is characterized in that the information peculiar to a commodity includes the price, and when displaying the price as a guide concerning the commodity, the control unit displays the price according to the predetermined condition.

According to the present invention, when price is displayed as the guide concerning the commodity, the price according to the predetermined condition of the commodity is displayed. If a commodity has a price which varies depending upon the discount, therefore, the price of the commodity can be changed without requiring human hands.

BEST MODE FOR CARRYING OUT THE INVENTION

Hereafter, preferred embodiments of an information management system according to the present invention will be described in detail while referring to accompanying drawing.

Figure 1:
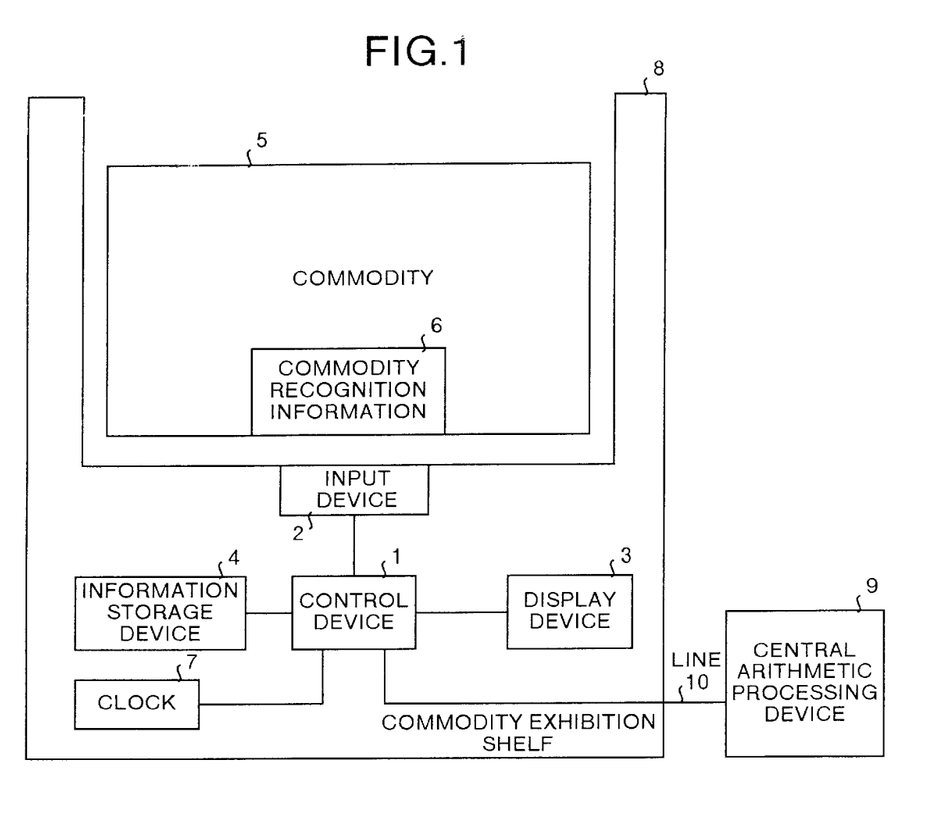
FIG. 1 is a block diagram showing a configuration example of an information management system according a first embodiment of the present invention.

In the first embodiment, an example of application of a POS system is shown. First of all, the configuration will be described. FIG. 1 is a block diagram showing a configuration example of an information management system according to a first embodiment of the present invention. This information management system includes a control device 1, an input device 2, a display device 3, an information storage device 4, and a clock 7 in a commodity exhibition shelf 8. Outside the commodity exhibition shelf 8, the information management system includes a central arithmetic processing device 9 connected to the control device 1 via a line 10. Furthermore, a commodity 5 is exhibited in the commodity exhibition shelf 8. The commodity 5 is provided with commodity recognition information 6 for recognizing and identifying commodity information in the form of a bar code. The commodity recognition information 6 includes information such as a commodity code.

Only one commodity 5 is shown in this figure. As a matter of fact, however, a plurality of commodities may be present in the commodity exhibition shelf 8. Furthermore, as shown in FIG. 1, the input device 2, the display device 3, the information storage device 4, the clock 7 and the central arithmetic processing device 9 are connected to the control device 1.

The control device 1 is, for example, a CPU (Central Processing Unit). The control device 1 not only conducts commodity management, but also conducts management and control of the whole system. The input device 2 is, for example, a touch scanner, and optically reads commodity recognition information 6 provided to the commodity 5. This input device 2 has a function of expanding a reading range, and has a mechanism for moving in the reading direction. The display device 3 is, for example, a LCD (Liquid Crystal Display). The display device 3 visually displays information such as a commodity recognition result based on the commodity recognition information 6.

The information storage device 4 has a large storage capacity like a hard disk device, and stores management information of each commodity. The clock 7 counts time and provides time information (such as date and time) to the control device 1. Information concerning the commodity is exchanged between the central arithmetic processing device 9 and the control device 1 via the line 10. At the time of a change of the information, the central arithmetic processing device 9 applies processing on the information. The line 10 is, for example, a LAN (Local Area Network). Devices other than those shown in this figure may be connected to the Line 10.

Figure 2:
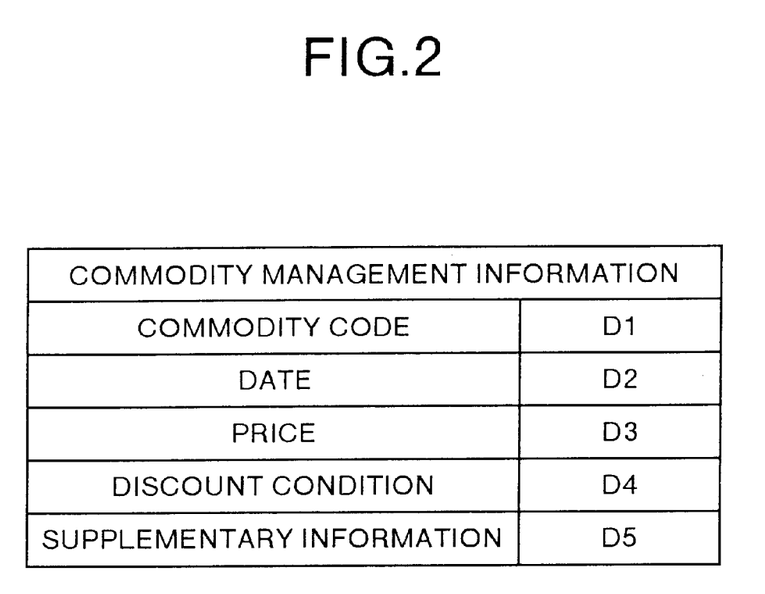
FIG. 2 is a diagram showing commodity management information according to the first embodiment.

A commodity management method in the information storage device 4 will now be described. FIG. 2 is a diagram showing commodity management information in the first embodiment. The commodity management information includes a commodity code representing a recognition number of a commodity D1, date D2 of manufacturing price D3 representing the selling price of the commodity, and discount condition D4 representing a threshold for a discount. As other commodity management information, there is supplementary information D5 such as a time table, a sales point table, an accumulated sales point, peculiar to the store handled typically in a POS system.

The discount condition (threshold) includes elapsed time after the manufacturing date (time representation), hours remained until closing time (time representation), a remaining quantity of the commodity (number representation), a time zone of time division service (service of providing a discount only in the time) (time representation), simultaneous discount information (situation, such as umbrellas in a rainy day), and a discount factor (reduction factor and reduction amount of money). Furthermore, as to the elapsed time since the manufacturing date, it is also possible to change the reduction factor as the time elapses. For example, it is possible to set the reduction factor so that it will become 10% after an elapse of one hour and it will become 20% after an elapse of two hours. Furthermore, as to the remaining quantity of the commodity, such a method that the reduction factor is increased provided that the remaining quantity is large is also possible.

Figure 3:
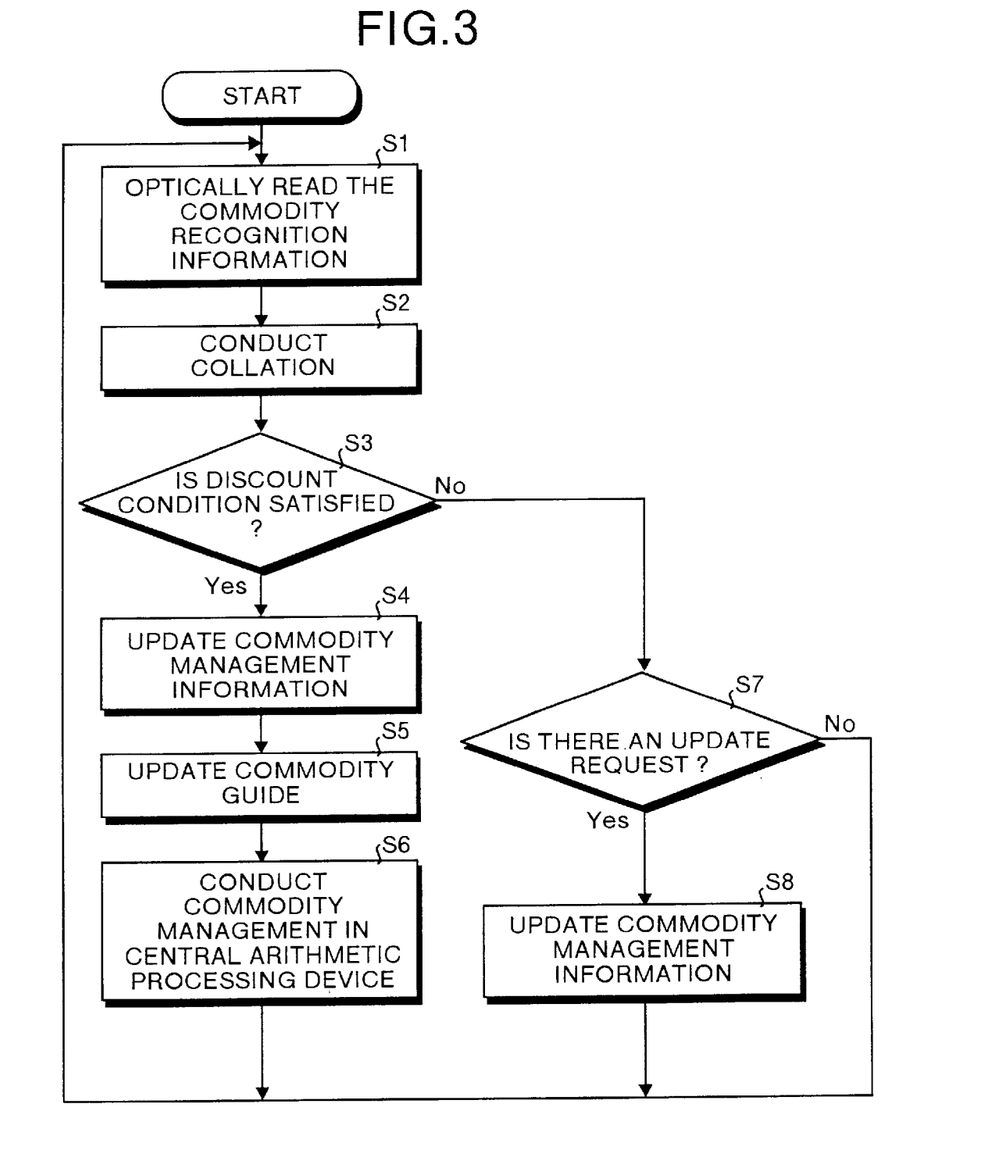
FIG. 3 is a flow chart showing the commodity management operation according to the first embodiment.
Figure 4:
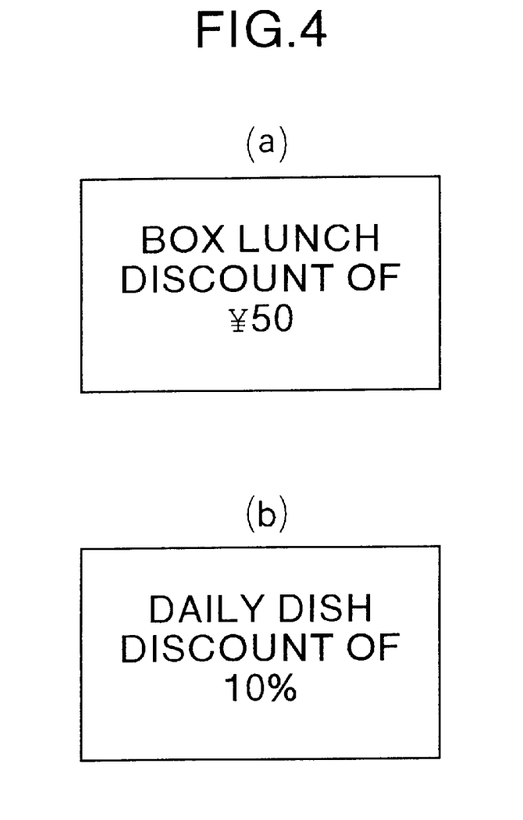
FIG. 4 is a diagram showing examples of discount display according to the first embodiment.

FIG. 3 is a flow chart showing commodity management operation according to the first embodiment. FIG. 4 is a diagram showing examples of discount display. First, a system manager disposes the commodity 5 on the commodity exhibition shelf 8. The commodity 5 is already provided with commodity recognition information 6. If the commodity 5 is arranged and then the whole system starts its operation, then the commodity recognition information 6 of the commodity 5 is read by the input device 2 according to the control of the control device 1 and the commodity recognition information 6 is sent to the control device 1 (step S1).

In the control device 6, commodity code collation processing is executed between the sent commodity recognition information 6 and commodity management information stored in the information storage device 4 (step S2). At that time, time information representing the date and hour is received from the clock 7, and the current date and hour are compared with the discount condition (time information) of the commodity management information. If on the basis of the commodity management information, the elapsed time since the manufacturing date has satisfied a discount condition, or the current time has satisfied a condition that a predetermined time before the closing time of the store is reached (step S3), then display data of the display device 3 is processed and a display picture is updated, by using the satisfaction of the condition as a trigger of a commodity guide (step S4).

In other words, if the elapsed time since the manufacturing date has satisfied the discount condition, then the pertinent commodity becomes a subject of discount at that time point and data representing the discount is added to the commodity management information concerning the commodity. As a result, a discount value is calculated according to stipulations based on a threshold (commodity management information) on condition of the elapsed time since the manufacturing date concerning the pertinent commodity, and the discount value is associated with the commodity name and they are displayed on the display device 3. If the pertinent commodity is a box lunch, a message such as "Box lunch: discount of ¥50" is displayed as shown in FIG. 4(*a*). In this way, the message can be transmitted to customers rapidly. By the way, the discount factor is altered in conformity with a discount factor which changes according to the elapsed time.

If the current time has satisfied a condition that a predetermined time before the closing time of the store is reached, then the pertinent commodity becomes a subject of discount at that time point and data representing the discount is added to the commodity management information concerning the commodity. As a result, a discount value is calculated according to stipulations based on a threshold (commodity management information) on condition that a predetermined time before the closing time of the store is reached as regards the pertinent commodity, and the discount value is associated with the commodity name and they are displayed on the display device 3. If the pertinent commodity is a daily dish, a message such as "Daily dish: discount of 10%" is displayed as shown in FIG. 4(*b*). In this way, the message can be transmitted to customers rapidly. By the way, the discount factor is altered in conformity with a discount factor which changes according to the elapsed time.

When the commodity management information heretofore described has been updated according to the discount condition (step S4), or when the commodity management information has been requested from the central arithmetic processing device 9 via the line 10 (step S5), the commodity management information is transferred to the central arithmetic processing device 9 via the line 10. Here, if the commodity management information is transferred to the central arithmetic processing device 9 whenever the commodity management information is updated according to the discount condition, then real time commodity management can be implemented in the central arithmetic processing device 9. If the commodity management information can be provided at a request of the central arithmetic processing device 9, it is possible to totalize commodity states of a plurality of commodity exhibition shelves individually or as a whole and conduct unitary management (step S6).

Thereafter, the processing returns to the step S1, and the above described processing is executed repetitively.

By the way, when judging the discount condition, the discount factor may not be fixed, but may be variable with due regard to the sales point table and the accumulated sales point typically contained in the commodity management information. In this case, a suitable price can be set according to the sales situation of the commodity.

The central arithmetic processing device 9 acquires the newest data from the information storage device 4 and executes settlement processing as well smoothly. By the way, it is also possible to newly set a discount condition on the central arithmetic processing device 9 side. If the discount condition is not satisfied at the time of the step S3, and the control device 1 is requested via the line 10 to update the commodity management information under the necessity of setting factors of, for example, the weather and temperature as a discount condition (step S7), then a new discount condition is transferred from the central arithmetic processing device 9 to the control device 1 (step S8).

As a result, the control device 1 adds the received new discount condition to the commodity management information concerning the required commodity. If that condition is satisfied, then the control device 1 executes processing accompanying the above described discount. In other words, a new discount condition is added to the condition decision factors of the step S3. Thereafter, the processing returns to the step S1, and the above described processing is executed repetitively. If an update request is not received at the step S7, the processing returns to the step S1 and all the above described steps are executed repetitively.

As heretofore described, in the first embodiment, information peculiar to the commodity is inputted by using a reading scheme, and when a commodity corresponding to that information satisfies, for example, the condition of a discount, a guide concerning the commodity is displayed. Therefore, management suitable for the commodity can be implemented dynamically and automatically. As a result, all commodity management in the store inclusive of the commodity management in the salesroom can be implemented without requiring human hands.

Furthermore, the central arithmetic processing device 9 is connected to the control device 1 via the line 10, and the information peculiar to the commodity, the discount condition, and so on in the information storage device 4 are updated via the control device 1. Therefore, it is possible to provide a required commodity with the newest information in real time.

Furthermore, when generating display data, time measured by the clock 7 is referred to. Therefore, the display of the guide concerning the commodity can be controlled according to the time.

Furthermore, irrespective of the discount condition, data for displaying the guide concerning the commodity may be generated on the basis of the information peculiar to the commodity. In this case, it is possible to display information peculiar to the commodity suitably without restriction.

Furthermore, information peculiar to the commodity placed in the commodity exhibition shelf 8 for exhibiting the commodity is input by using the reading scheme. When the commodity corresponding to the information has satisfied a predetermined condition, the guide concerning the commodity is displayed. Without the intervention of a person in the sales room, therefore, the commodity exhibition shelf itself can provide customers with necessary information.

Furthermore, information peculiar to the commodity attached to the commodity is read optically. Therefore, information peculiar to the commodity can be acquired easily.

Furthermore, if the price is displayed as the guide concerning the commodity, the price according to the discount condition of the commodity is displayed. As to a commodity for which a price varies depending upon the discount condition is set, therefore, the display price can be changed without requiring human hands. Furthermore, it is possible to read a bar code attached to the commodity at the time of liquidation, and determine at a terminal for liquidation whether a discount condition is satisfied. If a discount condition is satisfied, settlement can be conducted with the discounted value. As a result, it becomes possible to enhance the efficiency.

In the first embodiment, such a scheme that the input device 2 optically reads the commodity recognition information has been described. However, the present invention is not limited to this. As in a second embodiment hereafter described, the commodity recognition information may be read by using a radio scheme. In this case, almost all the configuration is the same as that of the first embodiment. Hereafter, therefore, only the differences will be described here. Sections having the same configuration as that of FIG. 1 will be denoted by like reference numeral.

Figure 5:
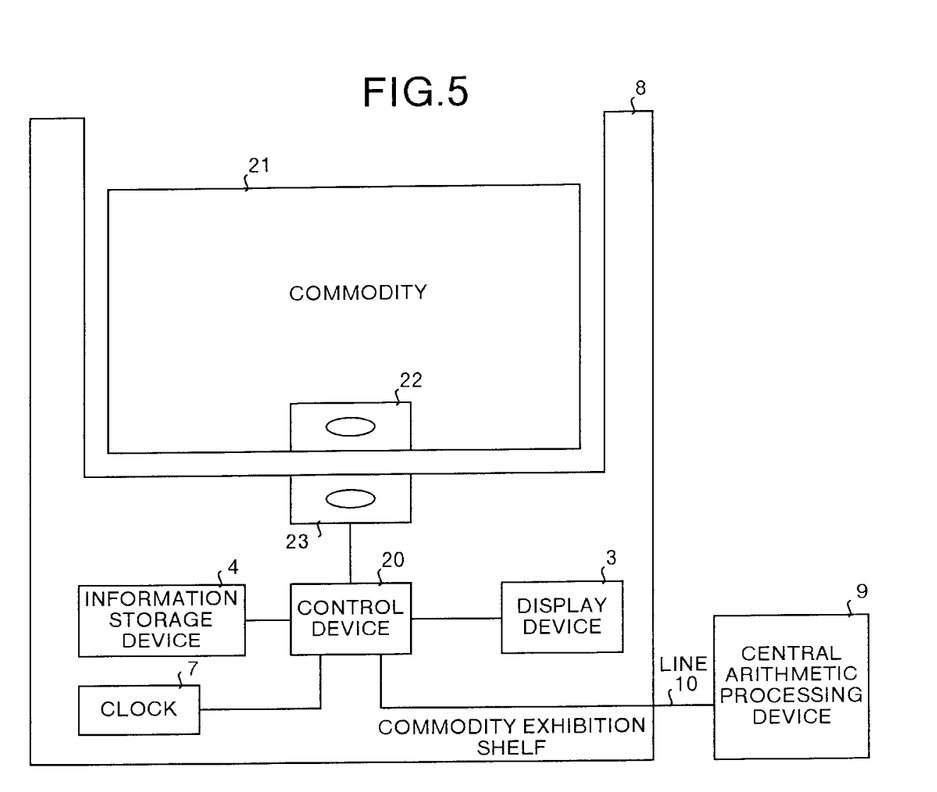
FIG. 5 is a block diagram showing a configuration example of an information management system according to a second embodiment of the present invention.

FIG. 5 is a block diagram showing a configuration example of an information management system according to the second embodiment of the present invention. In the second embodiment, the radio scheme is adopted. Therefore, a commodity 21 has a radio section 22 in its own package, and an input device 23 of the commodity exhibition shelf 8 has a radio function. Data is transmitted by radio means between the radio section 22 and the input device 23 having a radio function. Furthermore, since the radio scheme is adopted, a control device 20 is provided instead of the control device 1.

Figure 6:
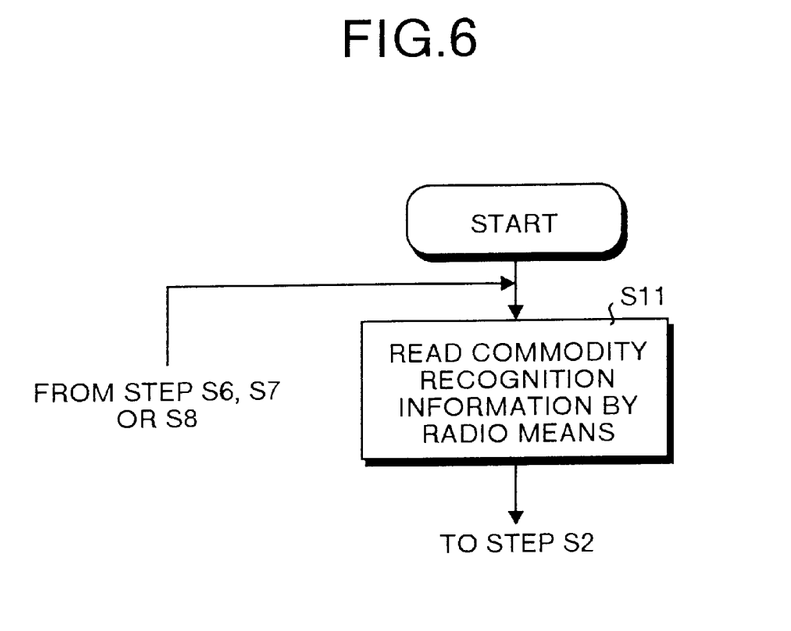
FIG. 6 is a flow chart showing a principal part of the operation according to the second embodiment.

The second embodiment also operates as a whole in the same way as the first embodiment. However, a radio scheme is used as the reading scheme of the commodity recognition information. Therefore, the reading operation is different. FIG. 6 is a flow chart showing a principal part of the operation according to the second embodiment. A commodity 21 is disposed on the commodity exhibition shelf 8, and thereafter commodity recognition information of the commodity 21 is read by the input device 23 via radio means under the control of the control device 20 (step S11). Processing after the step S11 is the same as that of the first embodiment. That is, the process from the step S2 of FIG. 3 is performed next. Accordingly, processing returns to step S11 from the steps S6, S7 or S8.

As heretofore described, in the second embodiment, it is a matter of course that the same effect as the first embodiment is obtained. In a package for housing the commodity 21, the radio section 22 for storing information peculiar to the commodity and conducting radio communication is provided. Information peculiar to the commodity stored in the radio section 22 is read by the input device 23 of the system in a radio form. As a result, information peculiar to the commodity can be acquired easily.

In the first and second embodiments, simply the commodity recognition information is read from the commodity disposed on the commodity exhibition shelf 8 in an optical or radio manner. However, the present invention is not limited to this. As hereafter described in a third embodiment, it is also possible to provide information to the commodity side and provide the commodity itself with a display function of the price and so on.

Figure 7:
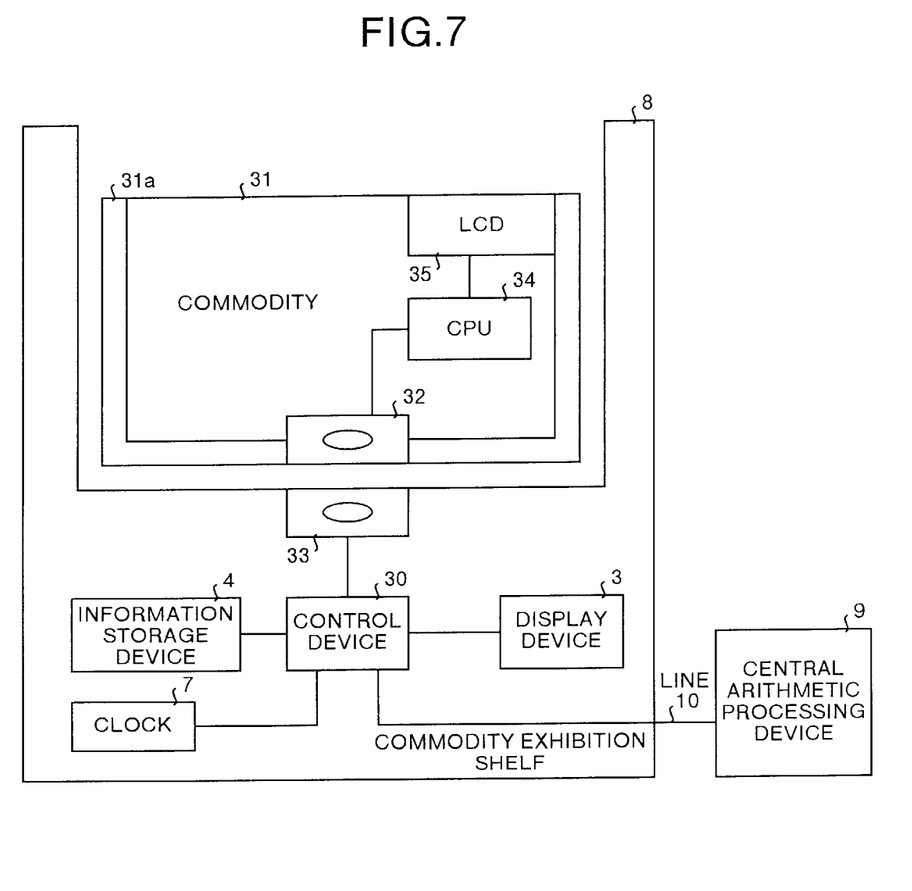
FIG. 7 is a block diagram showing a configuration example of an information management system according to a third embodiment of the present invention.

FIG. 7 is a block diagram showing a configuration example of an information management system according to the third embodiment of the present invention. In the third embodiment, the radio scheme is adopted in the same way as the second embodiment. A commodity 31 is housed in, for example, a plastic package 31a. In the package 31a, a radio section 32, a CPU 34 for controlling the operation of the commodity itself, and a LCD 35 for displaying information display under the control of the CPU 34 are provided.

The package 31a is removed by a cashier. Furthermore, an input device 33 of a commodity exhibition shelf 8 has a radio function. Data is transmitted by radio means between the radio section 32 and the input device 33 having a radio function. Furthermore, because of a difference in communication function from the control device 20, a control device 30 is provided instead of the control device 20.

Figure 8:
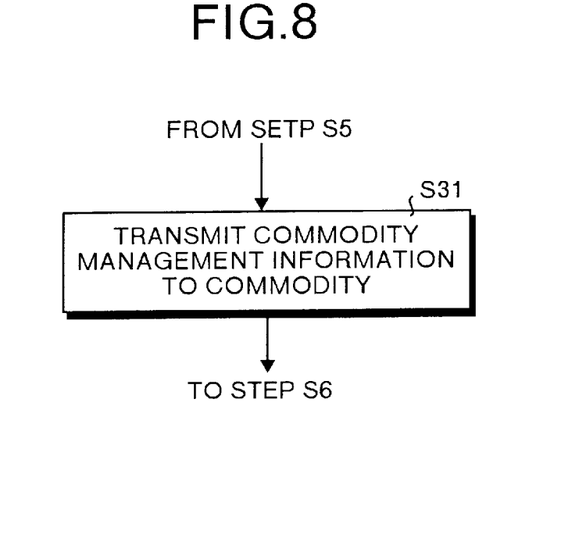
FIG. 8 is a flow chart showing a principal part of the operation of a system side according to the third embodiment.
Figure 9:
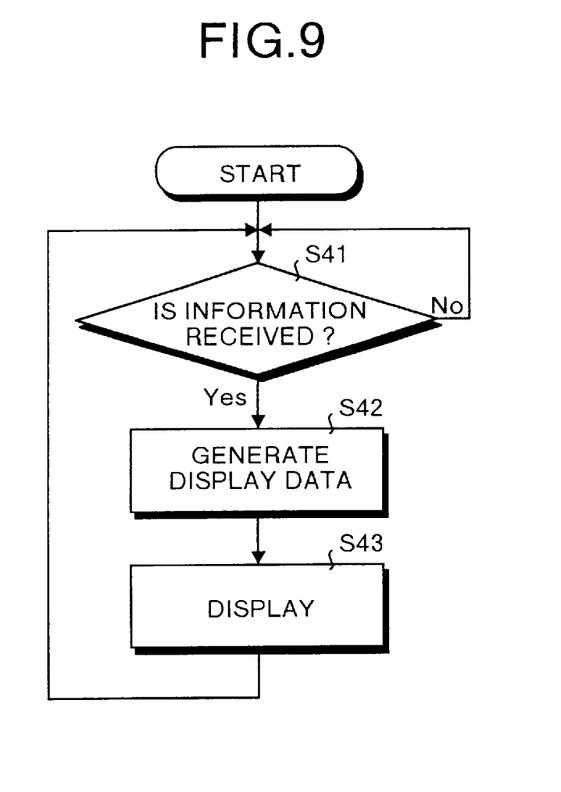
FIG. 9 is a flow chart showing operation of a commodity side according to the third embodiment.
Figure 10:
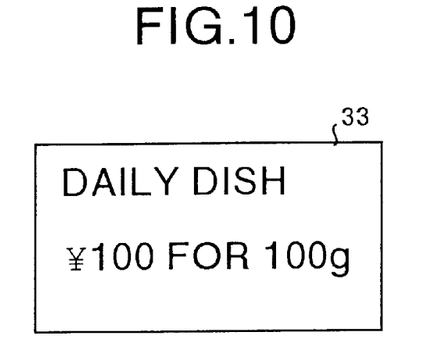
FIG. 10 is a diagram showing a display example of the commodity side according to the third embodiment.

The third embodiment also operates as a whole in the same way as the second embodiment. However, information is provided to the commodity 31 side as well, and the commodity itself is made to conduct information display. Hereafter, therefore, only operation differing from that of the second embodiment will be described. FIG. 8 is a flow chart showing a principal part of the operation of the system side. FIG. 9 is a flow chart showing the operation of the commodity side. FIG. 10 is a diagram showing a display example of the commodity side.

If a commodity guide is updated by the control device 30 in the commodity exhibition shelf 8 side (step S5 of FIG. 3), then data is transmitted by radio means so that the commodity itself may conduct display guide as regards the pertinent commodity (step S31 of FIG. 8). This data is commodity management information. For example, this data is a current discounted price. Thereafter, the processing proceeds to the step S6 of FIG. 3, and similar processing is executed.

When the commodity 31 receives the commodity management information from the commodity exhibition shelf 8 (step S41 of FIG. 9), then display data is generated on the basis of the commodity management information (step S42), and a commodity guide is displayed on the LCD 35 (step S43). If the pertinent commodity is a daily dish, then a message such as "Daily dish: ¥100 for 100 g" is displayed on the LCD 35 as shown in FIG. 10.

As a matter of course, effects similar to those of the second embodiment are obtained in the third embodiment, as heretofore described. Since the LCD 35 is provided in the package 31a and information received by the radio section 32 is displayed by the LCD 35, it is possible to ascertain, directly from an individual commodity on the commodity exhibition shelf 8, the information concerning the commodity.

By taking the case where a discount condition has been satisfied as an example, a display example of the commodity 31 side has been described. However, information may be displayed irrespective of the discount condition, so long as the information is contained in the commodity management information, like the manufacturing date. In this case, it is possible to continue a visual commodity guide to customers.

As an application example of the third embodiment, some commodity is sold by taking a price per gram as a reference as heretofore described in a fourth embodiment. As for such a commodity, the price varies according to the weight of the commodity. Therefore, there may be adopted such a configuration that a customer may ascertain a price according to a required quantity.

Figure 11:
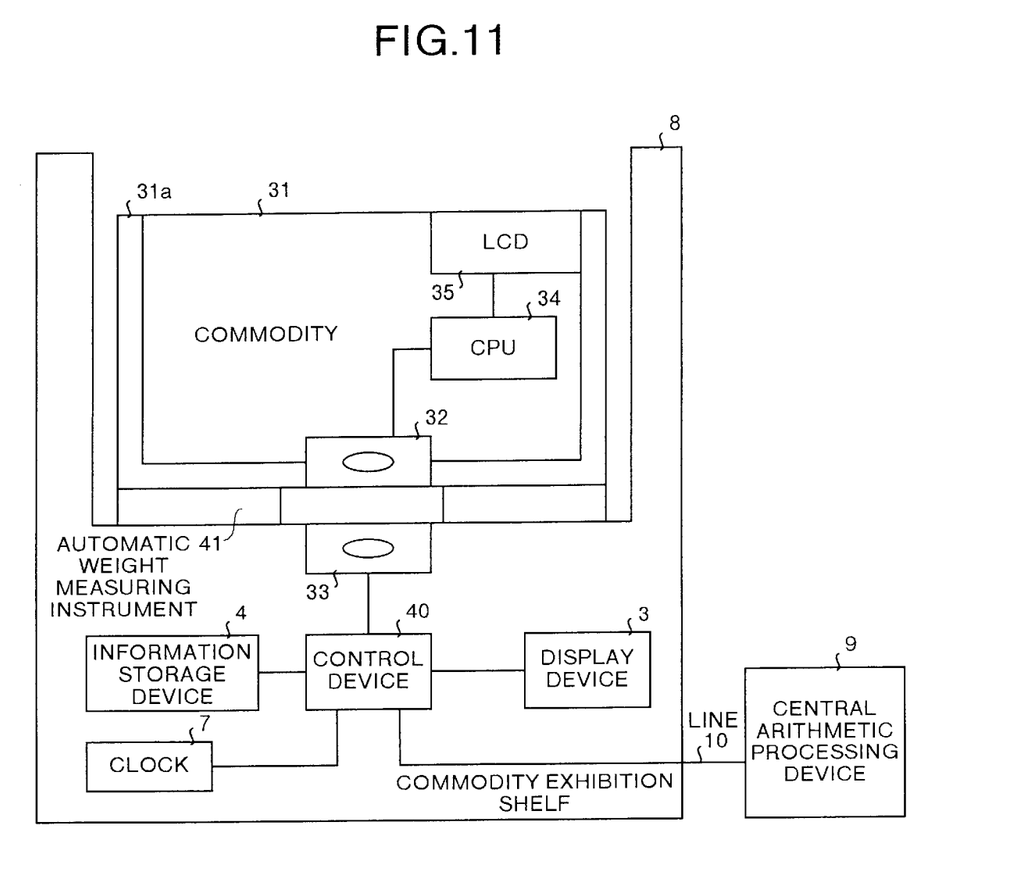
FIG. 11 is a block diagram showing a configuration example of an information management system according to a fourth embodiment.

FIG. 11 is a block diagram showing a configuration example of an information management system according to the fourth embodiment of the present invention. In the fourth embodiment, a configuration which is similar to that of the third embodiment as a whole is adopted. Therefore, respective components are denoted by like reference numerals. As a difference, an automatic weight measuring instrument 41 is provided on a commodity exhibition shelf 8. When the commodity 31 housed in the package 31a is disposed on the automatic weight measuring instrument 41, the fourth embodiment fulfills a function similar to that of the third embodiment. In other words, communication between a radio section 32 of a commodity 31 side and an input device 33 of a commodity exhibition shelf 8 side becomes possible. Since the function is different from that of the control device 30 in that the weight measuring function has been added, a control device 40 is provided instead of the control device 30.

Figure 12:
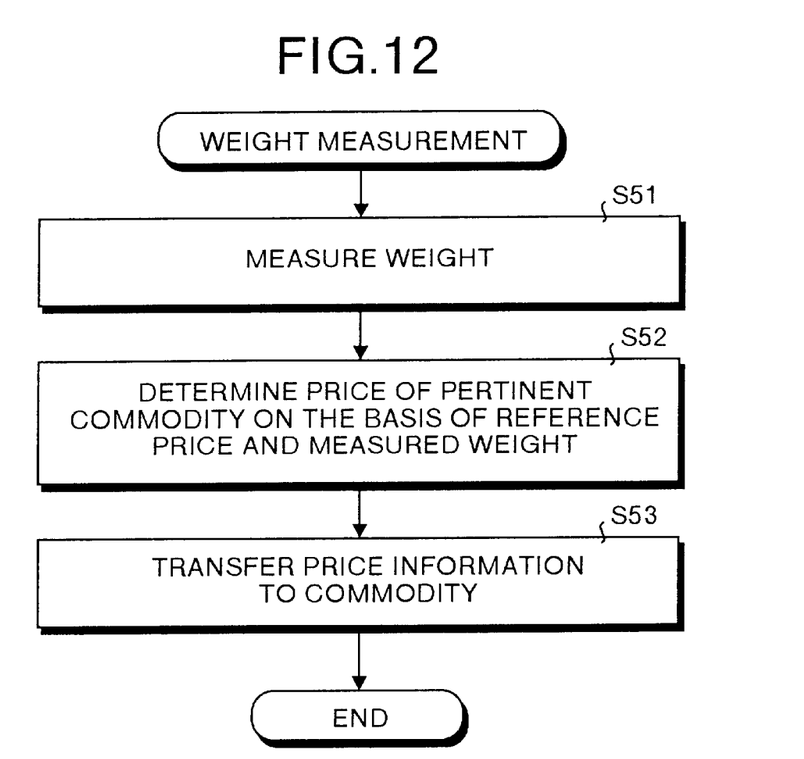
FIG. 12 is a flow chart showing weight measurement operation of system side according to the fourth embodiment.

The fourth embodiment also operates as a whole in the same way as the third embodiment. However, the weight of the commodity 31 is measured, and a price according to the measured value is provided to the commodity 31 side. Hereafter, therefore, only operation differing from the third embodiment will be described. FIG. 12 is a flow chart showing the weight measuring operation.

If a customer puts the commodity 31 into the package 31a and places them on the automatic weight measuring instrument 41, then the automatic weight measuring instrument 41 measures the weight and notifies the weight to the control device 40. Thus, the weight of the commodity 31 is measured (step S51). The control device 40 determines the price of the commodity on the basis of the table of price and weight stored in the information storage device 4 and the measured weight (step S52). The determined price is transmitted to the CPU 34 of the commodity 31 side by radio means in the same way as the third embodiment (step S53). In the same way as the third embodiment, the CPU 34 generates display data on the basis of received price information and makes the LCD 35 display it.

As a matter of course, effects similar to those of the third embodiment are obtained in the fourth embodiment, as heretofore described. The weight is measured by the automatic weight measuring instrument 41. On the basis of the measured weight and information peculiar to the commodity for associating the weight with the price, the price of the commodity is determined. The determined price is transmitted to the commodity by radio means. As for the price of a commodity which varies according to the weight, therefore, the newest price can be displayed on the commodity side.

In the first to fourth embodiments, a wired line is used as the line 10. The present invention is not limited to this, but a radio channel may be used.

Furthermore, a hard disk device may be used as the information storage device 4. Alternatively, a storage medium such as a memory card or a floppy disk may be used.

Furthermore, as the display device 3, a CRT (Cathode Ray Tube), a VFD, or a LED (Light Emitting Diode) may be used instead of the LCD. An alarm light may be used in combination therewith.

Furthermore, a computer such as a server, or a portable terminal may be used as the central arithmetic processing device 9.

Heretofore, the present invention has been described by referring to the first to fourth embodiments. Within the scope of the spirit of the present invention, various alternations are possible. They are not excluded from the scope of the present invention.

According to the present invention, information peculiar to the commodity is inputted by using a reading scheme, and when a commodity corresponding to that information satisfies, for example, the condition of a discount, a guide concerning the commodity is displayed, as heretofore described. Therefore, management suitable for the commodity can be implemented dynamically and automatically. This results in an effect that there is obtained an information management system capable of implementing all commodity management in the store inclusive of the commodity management in the salesroom without requiring human hands.

Furthermore, according to the present invention, the processing device is connected via the line, and the information peculiar to the commodity and a predetermined condition for displaying a guide concerning the commodity are updated. This results in an effect that there is obtained an information management system capable of providing a required commodity with the newest information in real time.

Furthermore, according to the present invention, measured time is referred to when generating display data. This results in an effect that there is obtained an information management system capable of controlling the display of the guide concerning the commodity according to the time.

Furthermore, according to the present invention, irrespective of the predetermined condition, data for displaying the guide concerning the commodity is generated on the basis of the information peculiar to the commodity. This results in an effect that there is obtained an information management system capable of displaying information peculiar to the commodity suitably without restriction.

Furthermore, according to the present invention, information peculiar to the commodity placed in the commodity exhibition shelf for exhibiting the commodity is input by using the reading scheme. When the commodity corresponding to the information has satisfied a predetermined condition, the guide concerning the commodity is displayed. This results in an effect that there is obtained an information management system capable of providing customers with necessary information from the commodity exhibition shelf itself, without the intervention of a person in the sales room.

Furthermore, according to the present invention, information peculiar to the commodity attached to the commodity is read optically. This results in an effect that there is obtained an information management system capable of easily acquiring information peculiar to the commodity.

Furthermore, according to the present invention, the radio section for storing information peculiar to the commodity and conducting radio communication is provided in a package for housing the commodity. Information peculiar to the commodity stored in the radio section is read in a radio form. This results in an effect that there is obtained an information management system capable of easily acquiring information peculiar to the commodity.

Furthermore, according to the present invention, a display section is provided in the package, and information received by the radio section is displayed. This results in an effect that there is obtained an information management system capable of ascertaining, directly from an individual commodity, the information concerning the commodity.

Furthermore, according to the present invention, weight of the commodity is measured. Further, the price of the commodity is determined on the basis of the measured weight and information peculiar to the commodity for associating the weight with the price, the price of the commodity is determined. The determined price is transmitted to the commodity by radio means. This results in an effect that there is obtained an information management system capable of displaying the newest price on the commodity side, as to the price of a commodity which varies according to the weight.

Furthermore, according to the present invention, in the case where a price is displayed as the guide concerning the commodity, a price according to the predetermined condition of the commodity is displayed. This results in an effect that there is obtained an information management system capable of changing the display price without requiring human hands, as to a commodity for which a price varying according to the discount condition is set.

INDUSTRIAL APPLICABILITY

As heretofore described, an information management system according to the present invention is useful for producing and managing data of commodities arranged on commodity display shelves, and suitable for implementing all commodity management in a store inclusive of commodity management in its salesroom, without requiring human hands.

What is claimed is:

1. An information management system for managing information concerning one or a plurality of commodities, each of said commodities having an information peculiar to the commodity attached thereto, said information management system comprising a commodity exhibition shelf on which the commodity is arranged, the commodity exhibition shelf including:

a storage unit which stores information representing a predetermined condition for displaying information peculiar to a commodity and a guide concerning said commodity, in association with the kind of said commodity;

an input unit which reads information peculiar to said commodity, which information is attached to said commodity, the information being read using a reading scheme;

a control unit which collates the information peculiar to said commodity read by said input with the information stored in said storage unit, and generates data for displaying the guide concerning said commodity, based on the information stored in said storage unit, when the information peculiar to said commodity read by said input unit matches with the information stored in said storage unit as a result of the collation and the predetermined condition associated with the kind of said commodity is satisfied;

a timer which measures time; and a display unit which displays the guide concerning said commodity based on the data generated by said control unit; wherein said control unit compares the time measured by said timer with information included in the information representing the predetermined condition, when generating data for displaying the guide concerning said commodity.

2. The information management system according to claim 1, wherein said information management system comprises a processing unit connected to said control unit via a line, and said processing unit updates information stored in said storage unit via said control unit.

3. The information management system according to claim 1, characterized in that said control unit generates for displaying the guide concerning said commodity based on information peculiar to said commodity stored in said storage unit.

4. The information management system according to claim 1, characterized in that said input unit optically reads information peculiar to said commodity, attached to said commodity.

5. The information management system according to claim 1 further comprising, a package which houses the commodity and which has a radio unit which stores information peculiar to said commodity and which can perform radio communication, and said input unit reads information peculiar to said commodity stored in said radio unit.

6. The information-management system according to claim 5, characterized in that said package further includes a commodity-side display unit for displaying information received by said radio unit in communication with said input unit.

7. The information management system according to claim 6 further comprising, a weight measurement unit which can measure the weight of said commodity, the information peculiar to said commodity includes information for associating its weight with its price, and said control unit determines the price of said commodity based on the weight measured by said weight measurement unit and information peculiar to said commodity stored in said storage unit and transmits the determined price by using said input unit in a radio form.

8. The information management system according to claim 1, characterized in that the information peculiar to a commodity includes the price of said commodity, and when displaying the price as a guide concerning said commodity, said control unit displays the price based on the predetermined condition.

9. A system for managing commodities, each commodity having attached thereto information peculiar to the commodity, comprising:

a commodity holder to hold the commodity;

a storage unit which stores information regarding the commodity;

an input unit which reads the information peculiar to said commodity and identifies the commodity;

a timer which measures time;

a control unit which collates the information peculiar to said commodity with the information stored in said storage unit, generates display data for the commodity, and updates the display data based on the time measured by the timer; and a display unit located in proximity to the commodity holder, to display the display data, as generated and updated by the control unit.

* * * * *